(12) United States Patent
Park

(10) Patent No.: US 9,082,278 B2
(45) Date of Patent: Jul. 14, 2015

(54) SURVEILLANCE SYSTEM

(75) Inventor: Gwang Hoon Park, Sungnam-si (KR)

(73) Assignee: UNIVERSITY-INDUSTRY COOPERATION GROUP OF KYUNG HEE UNIVERSITY, Yongin-Si, Gyeonggi-Do (KR)

(*) Notice: Subject to any disclaimer, the term of this patent is extended or adjusted under 35 U.S.C. 154(b) by 362 days.

(21) Appl. No.: 12/727,961

(22) Filed: Mar. 19, 2010

(65) Prior Publication Data

US 2011/0228092 A1    Sep. 22, 2011

(51) Int. Cl.
| | |
|---|---|
| *H04N 7/18* | (2006.01) |
| *G08B 13/196* | (2006.01) |
| *G06K 9/00* | (2006.01) |
| *G06T 7/20* | (2006.01) |
| *H04N 19/139* | (2014.01) |
| *H04N 19/102* | (2014.01) |
| *H04N 19/61* | (2014.01) |
| *H04N 19/11* | (2014.01) |
| *H04N 19/157* | (2014.01) |

(Continued)

(52) U.S. Cl.
CPC ...... *G08B 13/19608* (2013.01); *G06K 9/00771* (2013.01); *G06T 7/20* (2013.01); *H04N 19/102* (2014.11); *H04N 19/11* (2014.11); *H04N 19/139* (2014.11); *H04N 19/157* (2014.11); *H04N 19/17* (2014.11); *H04N 19/192* (2014.11); *H04N 19/61* (2014.11); *G06T 2207/10016* (2013.01); *G06T 2207/20021* (2013.01); *G06T 2207/30196* (2013.01); *G06T 2207/30232* (2013.01)

(58) Field of Classification Search
CPC ............... G08B 13/19608; G08B 13/19606; G06T 7/20; G06T 2207/20021; G06T 2207/30232; H04N 10/105

USPC .......... 348/77, 135, 137, 139, 143, 152–155, 348/159; 375/240.16–240.17
See application file for complete search history.

(56) References Cited

U.S. PATENT DOCUMENTS 5,594,504 A * 1/1997 Ebrahimi ................ 375/240.16
5,745,183 A * 4/1998 Lam ........................ 375/240.15

(Continued)

FOREIGN PATENT DOCUMENTS

| JP | 7-095573 | 4/1995 |
|---|---|---|
| JP | 11-069342 A | 3/1999 |

(Continued)

OTHER PUBLICATIONS

Jin-Sung Lee, et al "Moving target tracking algorithm based on the confidence measure of motion vectors," Proceedings of Image Processing 2001, pp. 369-372.

(Continued)

*Primary Examiner* — Madhu Woolcock
(74) *Attorney, Agent, or Firm* — Workman Nydegger

(57) ABSTRACT

A surveillance system includes an input unit to receive a plurality of video frames that are acquired through the use of a first camera, a video processing unit to perform prediction and encoding processes on the plurality of video frames, a moving-object tracking unit to track a moving object between the video frames based on at least part of the results from the prediction and encoding processes to generate location information of the moving object being tracked, and a control unit to generate a control signal based on the location information and to transmit the control signal to a second camera to control the movement of the second camera.

26 Claims, 16 Drawing Sheets

(51) Int. Cl.
*H04N 19/17* (2014.01)
*H04N 19/192* (2014.01)

(56) References Cited

U.S. PATENT DOCUMENTS

| | | | |
|---|---|---|---|
| 5,937,216 A * | 8/1999 | Homma et al. | 396/95 |
| 5,946,043 A * | 8/1999 | Lee et al. | 375/240.24 |
| 6,269,174 B1 * | 7/2001 | Koba et al. | 382/107 |
| 7,068,722 B2 * | 6/2006 | Wells | 375/240.16 |
| 7,082,210 B2 * | 7/2006 | Sugimoto et al. | 382/103 |
| 7,139,411 B2 * | 11/2006 | Fujimura et al. | 382/103 |
| 7,266,149 B2 * | 9/2007 | Holcomb et al. | 375/240.12 |
| 7,280,594 B2 * | 10/2007 | Sadeh et al. | 375/240.03 |
| 7,440,625 B2 * | 10/2008 | Spampinato | 382/232 |
| 7,489,829 B2 * | 2/2009 | Sorek et al. | 382/260 |
| 7,595,817 B1 * | 9/2009 | Zhang | 348/155 |
| 7,660,439 B1 * | 2/2010 | Lu et al. | 382/107 |
| 8,077,772 B2 * | 12/2011 | Mauchly et al. | 375/240.01 |
| 8,160,144 B1 * | 4/2012 | Varadarajan et al. | 375/240.16 |
| 8,170,102 B2 * | 5/2012 | Bhaskaran et al. | 375/240.13 |
| 8,175,160 B1 * | 5/2012 | Arici et al. | 375/240.16 |
| 8,213,509 B2 * | 7/2012 | Kapasi et al. | 375/240.16 |
| 8,275,049 B2 * | 9/2012 | Hussain et al. | 375/240.26 |
| 8,350,908 B2 * | 1/2013 | Morris et al. | 348/143 |
| 8,355,440 B2 * | 1/2013 | Qiu et al. | 375/240.16 |
| 2002/0114394 A1 * | 8/2002 | Ma | 375/240.16 |
| 2003/0128298 A1 * | 7/2003 | Moon et al. | 348/578 |
| 2003/0174775 A1 * | 9/2003 | Nagaya et al. | 375/240.12 |
| 2004/0096198 A1 * | 5/2004 | Lee | 386/111 |
| 2004/0119819 A1 * | 6/2004 | Aggarwal et al. | 348/143 |
| 2005/0008193 A1 * | 1/2005 | Toyama | 382/103 |
| 2005/0024206 A1 | 2/2005 | Samarasekera et al. | |
| 2005/0063461 A1 * | 3/2005 | Lee et al. | 375/240.03 |
| 2005/0175089 A1 * | 8/2005 | Jung | 375/240.03 |
| 2005/0207622 A1 * | 9/2005 | Haupt et al. | 382/118 |
| 2005/0276326 A1 | 12/2005 | Drezner | |
| 2006/0028550 A1 | 2/2006 | Palmer, Jr. et al. | |
| 2006/0126737 A1 | 6/2006 | Boice et al. | |
| 2006/0146933 A1 * | 7/2006 | Lu et al. | 375/240.12 |
| 2006/0171562 A1 * | 8/2006 | Yoshida | 382/104 |
| 2006/0222074 A1 * | 10/2006 | Zhang | 375/240.16 |
| 2006/0233254 A1 * | 10/2006 | Lee et al. | 375/240.16 |
| 2007/0109409 A1 * | 5/2007 | Yea et al. | 348/153 |
| 2007/0147503 A1 * | 6/2007 | Ikeda et al. | 375/240.12 |
| 2008/0075169 A1 * | 3/2008 | Ugur et al. | 375/240.16 |
| 2008/0130948 A1 * | 6/2008 | Ozer | 382/103 |
| 2008/0166045 A1 * | 7/2008 | Xu et al. | 382/170 |
| 2008/0292142 A1 * | 11/2008 | Woo et al. | 382/107 |
| 2009/0060276 A1 * | 3/2009 | Yu et al. | 382/103 |
| 2009/0147853 A1 * | 6/2009 | Dane et al. | 375/240.16 |
| 2009/0161911 A1 * | 6/2009 | Shih et al. | 382/103 |
| 2009/0245573 A1 * | 10/2009 | Saptharishi et al. | 382/103 |
| 2009/0315712 A1 * | 12/2009 | Bloemendaal et al. | 340/541 |
| 2010/0013917 A1 * | 1/2010 | Hanna et al. | 348/143 |
| 2010/0124274 A1 * | 5/2010 | Cheok et al. | 375/240.03 |
| 2010/0157073 A1 * | 6/2010 | Kondo et al. | 348/208.4 |
| 2010/0191391 A1 * | 7/2010 | Zeng | 701/1 |
| 2010/0208986 A1 * | 8/2010 | Cobb et al. | 382/165 |
| 2010/0315547 A1 * | 12/2010 | Takada | 348/416.1 |
| 2011/0075735 A1 | 3/2011 | Drezner | |

FOREIGN PATENT DOCUMENTS

| | | |
|---|---|---|
| JP | 2002-262296 A | 9/2002 |
| KR | 10-2001-0000107 | 1/2001 |
| KR | 10-2004-0079550 | 9/2004 |
| KR | 10-2008-0020441 | 3/2008 |

OTHER PUBLICATIONS

Sung Wook Seol, et al "An automatic detection and tracking system of moving objects using double difference based motion estimation," ITC-CSCC 2003.

Gilad Halevi, et al "Motion of disturbances: detection and tracking of multibody nonrigid motion," Proc. of IEEE CVPR, San Juan, Jun. 1997, pp. 897-902.

Gilad Adiv "Determining 3-D motion and structure from optical flow generalized by several moving objects," IEEE Trans. PAMI, vol. 7, pp. 384-401, 1985.

Kevin Nickels, et al "Estimating uncertainty in SSD-based feature tracking." Image and Vision Computing, vol. 20, No. 1, pp. 47-58, 2002.

Guangzheng Yang, et al "Human face detection in complex background", Pattern Recognition, vol. 27, No. 1, pp. 53-63, 1994.

Thomas Wiegand, et al "Overview of the H.264/AVC Video Coding Standard" IEEE Transactions on Circuits and Systems for Video Technology, vol. 13, No. 7, Jul. 2003.

Australian Patent Office; International Search Report and Written Opinion in corresponding PCT application (PCT/KR2010/009062) mailed Mar. 10, 2011.

* cited by examiner

| NUM | INTRA 4×4 PREDICTION MODE |
|---|---|
| 0 | VERTICAL |
| 1 | HORIZONTAL |
| 2 | DC |
| 3 | DIAGONAL-DOWN-LEFT |
| 4 | DIAGONAL-DOWN-RIGHT |
| 5 | VERTICAL-RIGHT |
| 6 | HORIZONTAL-DOWN |
| 7 | VERTICAL-LEFT |
| 8 | HORIZONTAL-UP |

FIG. 3B
| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |
FIG. 3C
MODE 0 : VERTICAL
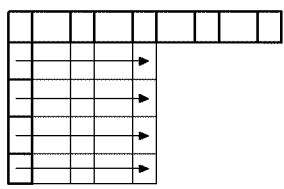
MODE 1 : HORIZONTAL
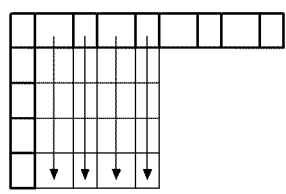
MODE 2 : DC
| | A | B | C | D | | | |
|---|---|---|---|---|---|---|---|
| I | | | | | | | |
| J | (A+B+C+D | | | | | | |
| K | +I+J+K+L)/8 | | | | | | |
| L | | | | | | | |
MODE 3: DIAGONAL_DOWN_LEFT
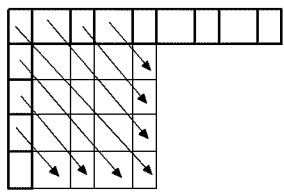
MODE 4 : DIAGONAL_DOWN_RIGHT
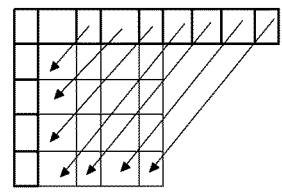
MODE 5 : VERTICAL_RIGHT
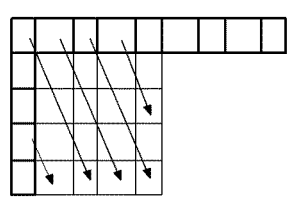
MODE 6 : HORIZONTAL_DOWN
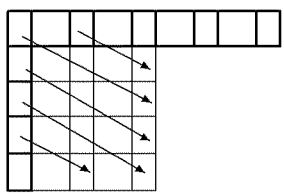
MODE 7 : VERTICAL_LEFT
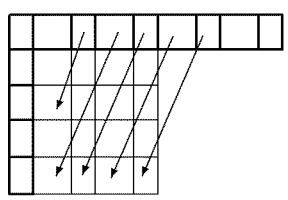
MODE 8 : HORIZONTAL_UP
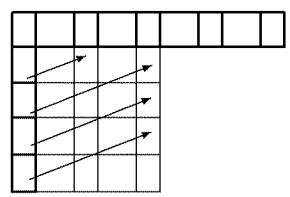

PREVIOUSLY ENCODED FRAMES	BLOCKS IN CURRENT FRAME

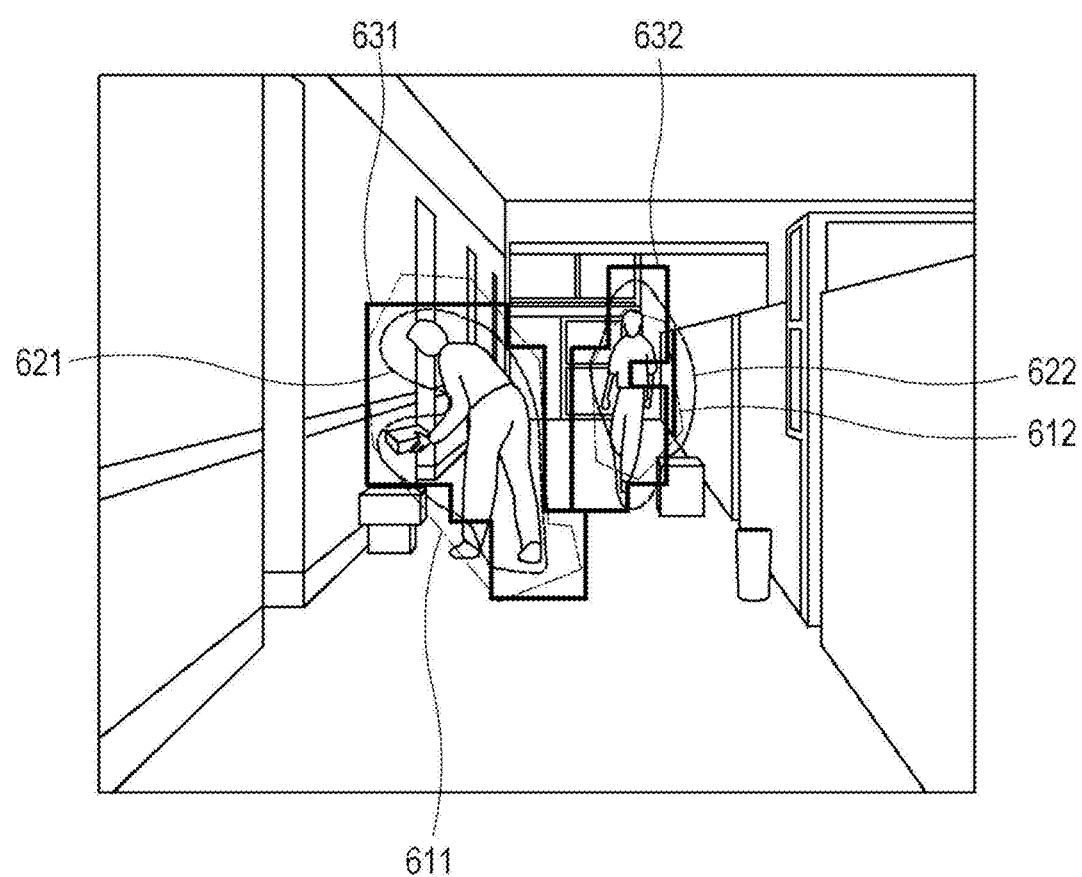

SURVEILLANCE SYSTEM

BACKGROUND

Surveillance systems are commonly used to automatically detect particular incidents of interest, such as the appearance of an intruder, an abandoned package, and a particular face. The systems are also used in monitoring a restricted region such as banks, public institutions, congested roads or the like. In line with the increasing demand for such surveillance systems, there is an interest to encode captured video images of a variety of circumstances as well as track moving objects for efficient transmission over a data network for remote control, without increasing hardware cost or complexity of such heavy computational loads in a surveillance system.

SUMMARY

Various embodiments of surveillance systems and surveillance techniques are provided. In one embodiment, by way of non-limiting example, a surveillance system includes an input unit configured to receive a plurality of video frames that are acquired through the use of a first camera, a video processing unit configured to perform prediction and encoding processes on the plurality of video frames, and a moving-object tracking unit configured to track a moving object between the plurality of video frames based on at least part of the results from the prediction and encoding processes to generate location information of the moving object being tracked. The surveillance system further includes a control unit configured to generate a control signal based on the location information and transmits the control signal to a second camera to control the movement of the second camera.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 3A to 3C show a schematic diagram illustrating an intra-prediction process performed by the surveillance system of FIG. 1.

FIGS. 6A to 6D illustrate results of motion classification performed on the sample video image as shown in FIG. 5A.

DETAILED DESCRIPTION

Figure 1:
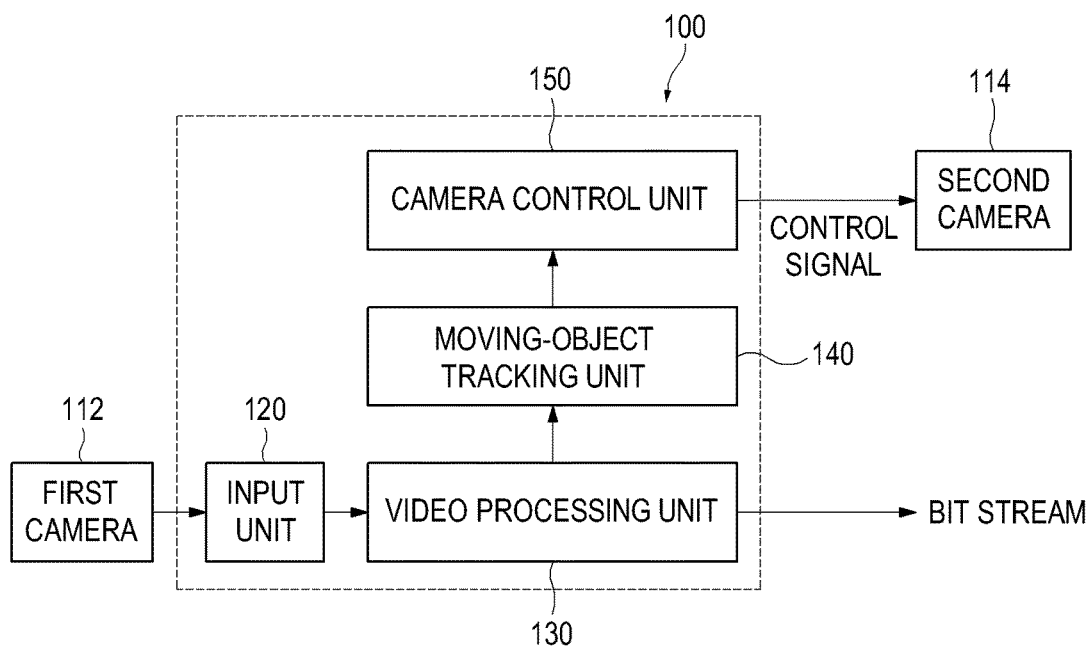
FIG. 1 shows a schematic block diagram of an illustrative embodiment of a surveillance system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and made part of this disclosure.

It is to be understood that systems and method according to the illustrative embodiments of the present disclosure may be implemented in various forms including hardware, software, firmware, special purpose processors, or a combination thereof. For example, one or more example embodiments of the present disclosure may be implemented as an application having program or other suitable computer-executable instructions that are tangibly embodied on at least one computer-readable media such as a program storage device (e.g., hard disk, magnetic floppy disk, RAM, ROM, CD-ROM, or the like), and executable by any device or machine, including computers and computer systems, having a suitable configuration. Generally, computer-executable instructions, which may be in the form of program modules, include routines, programs, objects, components, data structures, etc. that perform particular tasks or implement particular abstract data types. The functionality of the program modules may be combined or distributed as desired in various embodiments. It is to be further understood that, because some of the constituent system components and process operations depicted in the accompanying figures can be implemented in software, the connections between system units/modules (or the logic flow of method operations) may differ depending upon the manner in which the various embodiments of the present disclosure are programmed.

FIG. 1 shows a schematic block diagram of an illustrative embodiment of a surveillance system 100. As depicted, surveillance system 100 may include an input unit 120, a video processing unit 130, a moving-object tracking unit 140 and a camera control unit 150.

Input unit 120 may receive a plurality of video frames from an image capturing device (not shown), such as a camera, a camcorder or the like. For example, input unit 120 may be coupled to a first camera 112 and to receive video having video frames captured or taken by first camera 112. Depending on the particular implementation requirements, first camera 112 may be a wide-angle camera. In some embodiments, input unit 120 may be an interface unit implementing a communication protocol (either wired or wireless) by employing a digital interface protocol, such as a serial port, parallel port, PS/2 port, universal serial bus (USB) link, firewire or IEEE 1394 link, or wireless interface connection, such as an infrared interface, BlueTooth®, ZigBee, high-definition multimedia interface (HDMI), high-bandwidth digital content protection (HDCP), wireless fidelity (Wi-Fi), local area network (LAN), wide area network (WAN) or the like. Input unit 120 may transform the video frames into digital image data. Input unit 120 may use any of a variety of well-known data processing techniques such as analog to digital conversion, quantization or the like to obtain digital image data from video frame(s). The digital image data may represent features of the image frames such as intensity, color or the like, at various pixel locations of the image frames. In one embodiment, input unit 120 may include a digital converter (not shown) that transforms the video frames into digital image data.

Video processing unit 130 may process the digital image data generated or produced by input unit 120, e.g., the digital image data generated from the video frames captured by an image capturing device (e.g., first camera 112). For example, as part of the processing of the digital image data, video processing unit 130 may carry out prediction and encoding processes to produce a coded bit stream, which may be transmitted to a remote control unit (not shown) over a data network. In one embodiment, video processing unit 130 may generate prediction and encoding information and transmit them to moving-object tracking unit 140. Moving-object tracking unit 140 may capture, identify, detect and/or track an object between multiple video frames, by using the prediction and encoding information. The prediction and encoding processes and the tracking of the object will be described in detail hereinafter.

Camera control unit 150 is configured to control the operations of a second camera 114. Depending on the particular implementation requirements, second camera 114 may be a wide-angle camera. Camera control unit 150 may be configured to generate a control signal based on information generated by moving-object tracking unit 140 (e.g., location information of moving objects in video frames), and to transmit the generated control signal to control the operation or movements of second camera 114. The operation of second camera 114 to be controlled by camera control unit 150 and the generation of the control signal will be described in detail hereinafter.

In some embodiments, surveillance system 100 (or respective units of surveillance system 100 such as video processing unit 130, moving-object tracking unit 140 and camera control unit 150) may include processors, microprocessors, digital signal processors (DSPs), microcontrollers, or the like. Surveillance system 100 may include at least one embedded system memory to store and operate software applications, including an operating system, at least one application program, and other program modules. Surveillance system 100 facilitates the running of a suitable operating system configured to manage and control the operations of surveillance system 100. These operations may include the input and output of data to and from related software application programs/modules. The operating system may provide an interface between the software application programs/modules and, for example, the hardware components of surveillance system 100.

In some embodiments, surveillance system 100 may include a memory (not shown) configured to store data that is communicated between the components or units/modules of surveillance system 100. Various components or units/modules of surveillance system 100 may utilize the memory (including volatile and nonvolatile) for data processing. For example, input unit 120 may store one or more digital image data that is acquired via one or more image capturing devices (e.g., digital image data via first camera 112) into the memory for processing by video processing unit 130. Video processing unit 130 may retrieve and process the digital image data from the memory.

Figure 2:
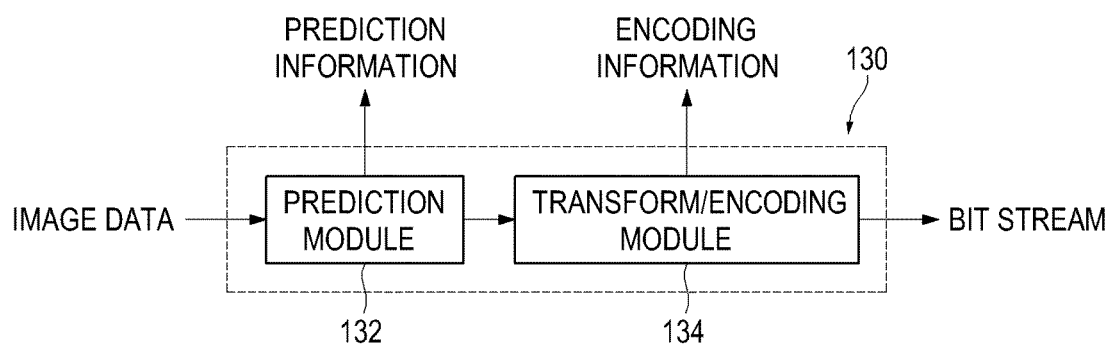
FIG. 2 shows a schematic block diagram of a video processing unit in the surveillance system as shown of FIG. 1.

FIG. 2 illustrates a schematic block diagram showing an illustrative embodiment of the video processing unit shown in FIG. 1. Video processing unit 130 may include prediction module 132 and transform/encoding module 134. Prediction module 132 may receive image data from input unit 120 (or a memory) and process a video frame of the image data in units of a macroblock (e.g., 16×16 displayed pixels) to generate information on motion estimation of a current macroblock (e.g., motion vectors) based on previously-encoded video data (hereinafter referred to as "prediction information"). The prediction information of a current macroblock may be determined based on the previously-encoded video data either from a current video frame (hereinafter referred to as "intra-prediction" or "intra-coding") or from other video frames that have already been encoded and transmitted (hereinafter referred to as "inter-prediction" or "inter-coding"). Prediction module 132 may subtract the predicted macroblock (which may be represented by the prediction information) from a current macroblock to form residual information. The generation of the prediction information and the residual information will be described in detail hereinafter with respect to FIGS. 3 to 5. Transform/encoding module 134 may receive the residual information from prediction module 132 and transform the residual information to output a set of coefficients, e.g., by using a discrete cosine transform (DCT), which is then quantized. The quantized transform coefficients may be converted into a bit stream, e.g., using variable length coding and/or arithmetic coding methods, for transmission over a data network.

Figure 3A:
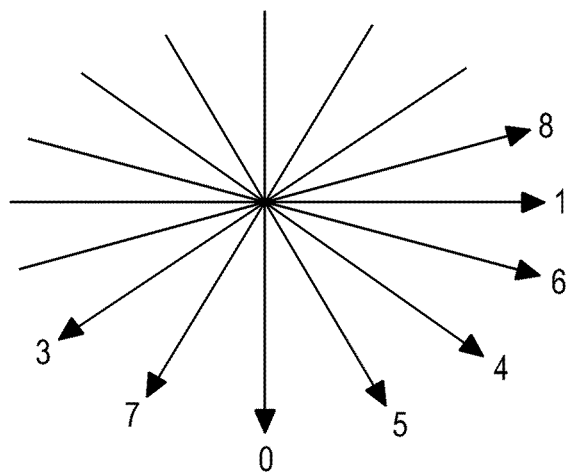

In some embodiments, prediction module 132 of video processing unit 130 may generate prediction information by using motion estimation methods, e.g., variable-size block motion estimation supported by compression standards, such as motion-picture-experts group (MPEG) or H.264. According to H.264 standards, as shown in FIGS. 3A to 3C, intra-prediction in a video frame may be performed by using 4×4, 8×8 or 16×16 block sizes to predict a current macroblock from surrounding previously-encoded pixels within the same video frame. The H.264 standard exploits the spatial correlation between adjacent macroblocks/blocks for Intra prediction. In particular, the current macroblock may be predicted by adjacent pixels in the upper and the left macroblocks that are decoded earlier. For the luma prediction samples, the prediction block may be formed for each 4×4 subblock, each 8×8 block, or a 16×16 macroblock. One case is selected from a total of 9 prediction modes for each 4×4 and 8×8 luma blocks; 4 modes for 16×16 luma block; and 4 modes for each chroma blocks.

In a 4×4 Intra prediction mode, the value of each 4×4 block luma sample may be predicted from neighboring pixels above or to the left of a 4×4 block. In one embodiment there are nine different directions prediction module 132 may select as illustrated in FIG. 3A. Each prediction direction corresponds to a particular set of spatially-dependent linear combinations of previously decoded samples for use as the prediction of each input sample. For the purpose of illustration, FIG. 3B shows a 4×4 block of pixels "a" to "p", belonging to a macroblock to be coded. Pixels A to M are already decoded neighboring pixels used in predicting pixels of the current 4×4 block. FIG. 3C shows the nine 4×4 intra prediction modes. For example, for mode 2 (DC), all pixels (labeled "a" to "p") are predicted by (A+B+C+D+I+J+K+L)/8. Mode 0 specifies the vertical prediction mode in which pixels (labeled "a", "e", "i" and "m") are predicted from A, and the pixels (labeled "b", "f", "j" and "n") are predicted from B, and so on. If Horizontal prediction is employed (mode 1), pixels "a" to "d" are predicted by pixel E, pixels "e", "f", "g", "h" by pixel F. For mode 3 (diagonal down left), mode 4 (diagonal down right), mode 5 (vertical right), mode 6 (horizontal down), mode 7 (vertical left), and mode 8 (horizontal up), the predicted samples are formed from a weighted average of the prediction samples A-M. For example, samples "a" and "d" are respectively predicted by rounding (I*4+M*2+A*4) and rounding (B*4+C*2+D*4) in mode 4, also by rounding (I*2+J*2) and rounding (J*4+K*2+L*4) in mode 8. The best prediction mode is selected for each block by minimizing the residual between the encoded block and its prediction.

Figure 4:
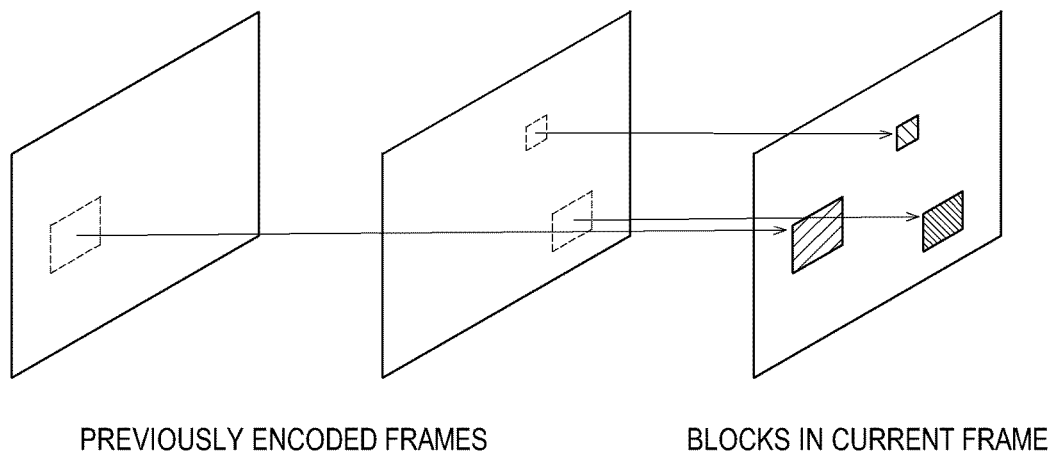
FIG. 4 shows a schematic diagram illustrating an inter-prediction process performed by the surveillance system of FIG. 1.

As shown in FIG. 4, inter-prediction may use a range of block sizes (e.g., variable-size block of 16×16 pixels down to 4×4 pixels) to predict pixels or a macroblock in a current video frame from similar regions in previously-encoded video frames. In particular, inter-prediction may be performed to find the best match of motion compensation blocks between successive video frames. Motion vectors may then be determined to represent a relative displacement between two macroblocks (i.e., two best matching macroblocks) in a current video frame and a previously-encoded video frame. For example, H.264 supports motion compensation block sizes ranging from 16×16 to 4×4 luminance samples with many options. The luminance component of each macroblock (16×16 samples) may be split up in 4 ways as 16×16, 16×8, 8×16 or 8×8. If the 8×8 mode is chosen, each of the four 8×8 macroblock partitions within the macroblock may be split further in 4 ways as 8×8, 8×4, 4×8 or 4×4. A separate motion vector is required for each partition or sub-partition. Each motion vector may be coded for transmission.

As described above in detail, the prediction information generated by prediction module 132 of video processing unit 130 may include motion vectors that represent a relative displacement between two macroblocks in a current video frame and a previously-encoded video frame. In one embodiment, the motion displacement may be derived from a motion vector represented by a two-dimensional vector that provides an offset from the coordinates in the current video frame to the coordinates in the previously-encoded video frame. In a variable-size block motion estimation method, different sizes of macroblocks, such as 4×4, 4×8, 8×4, 8×8, 8×16, 16×8 and 16×16, may be used in calculating motion vectors.

Figure 5A:
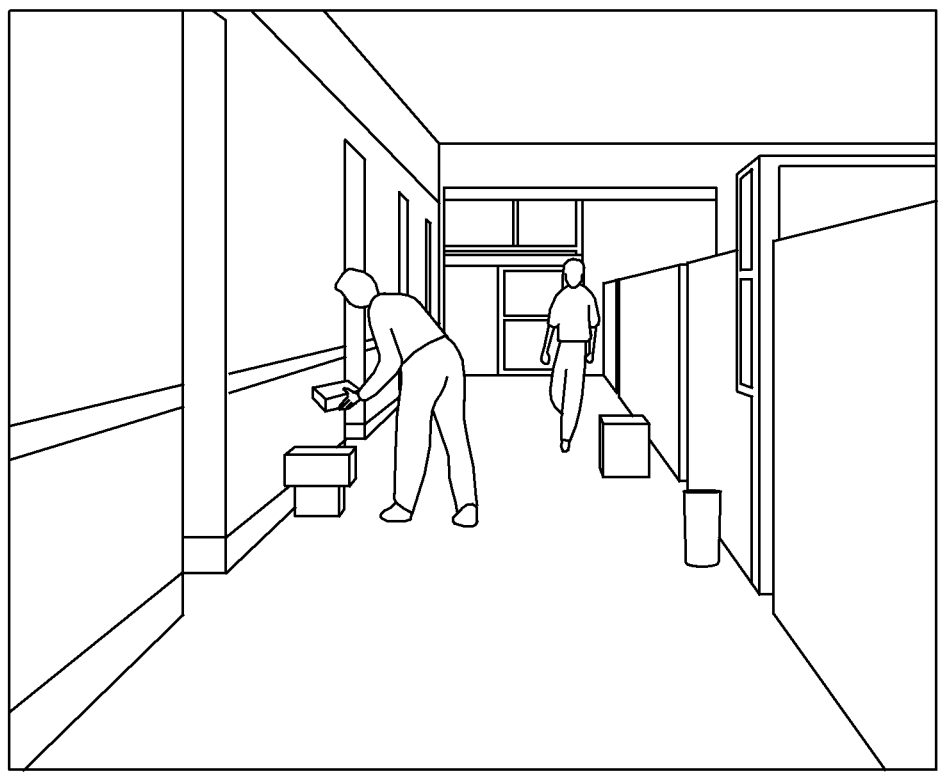
FIGS. 5A to 5E illustrate a sample video image, and prediction and encoding information thereon calculated by the surveillance system of FIG. 1.
Figure 5B:
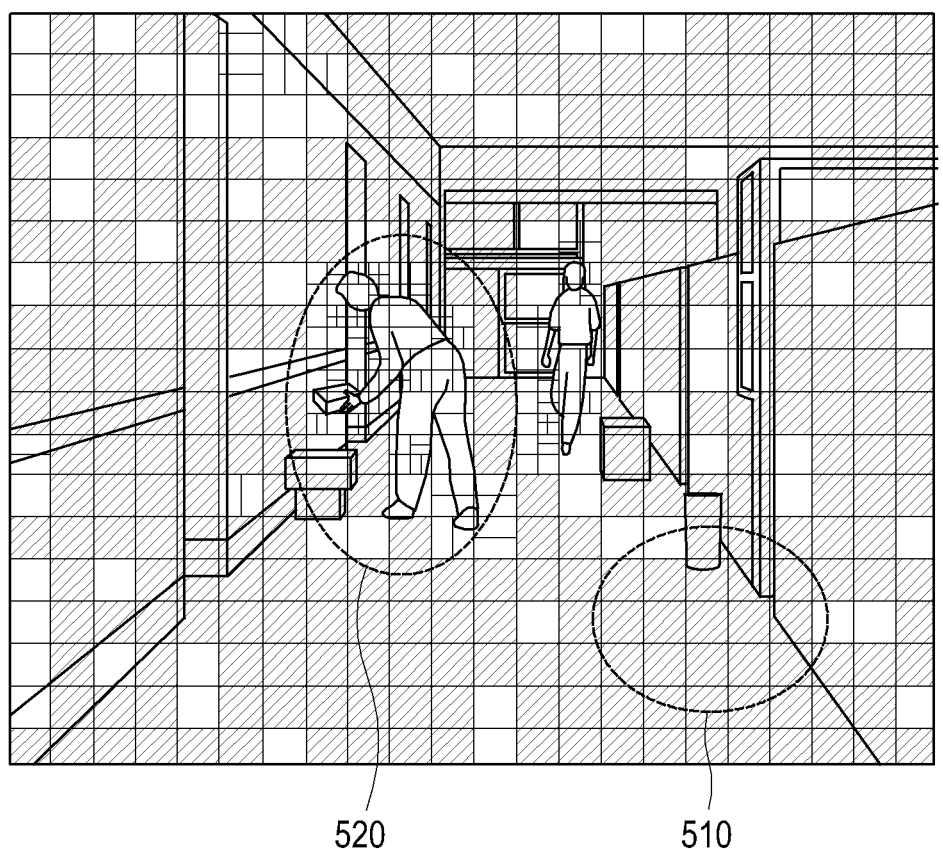
Figure 5C:
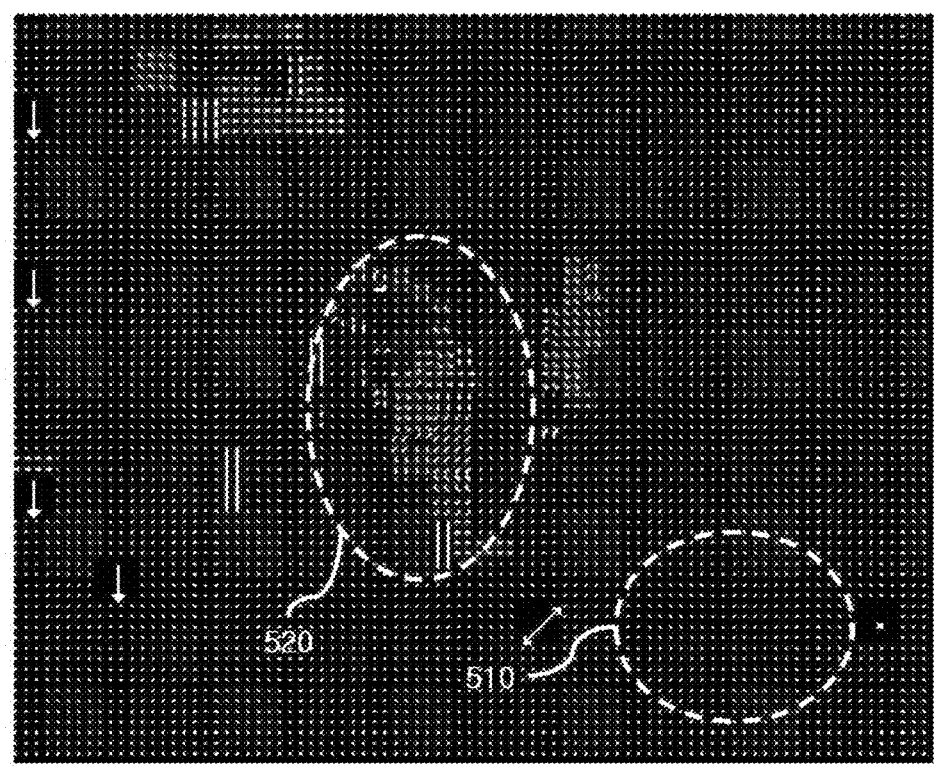

FIG. 5A illustrates a sample video image including a moving object, such as a human walking, and FIG. 5B illustrates partitioning of the image with various sizes of macroblocks. For example, as shown in FIG. 5B, larger sizes of blocks (which are in general denoted using slanted lines) may be allocated in a relatively stationary and homogenous image area, such as a background area 510, in a video frame. In contrast, smaller size blocks (which are in general denoted as empty blocks) may be allocated in an image area containing complex motion objects (e.g., a human moving or walking as shown in FIG. 5B), such as a foreground area 520, in a video frame. FIG. 5C illustrates motion vectors that may be obtained based on the partitioning of the image as shown in FIG. 5B. As shown in FIG. 5C, if a small object (e.g., in image area 520) is moving on a stationary background (e.g., in image area 510), variable-sized motion vectors may be obtained via motion estimation. In such case, motion vectors with small values (or even no values) may be obtained from the stationary background. Motion vectors may be calculated by performing various block matching methods. According to the H.264 standard, motion vectors are determined by performing an exhaustive search of the best block match between a current video frame and a previously-encoded video frame for all block sizes defined in the standard. Alternatively, any other types of block matching methods including adaptive block matching methods may be used to improve block matching performance.

Figure 5D:
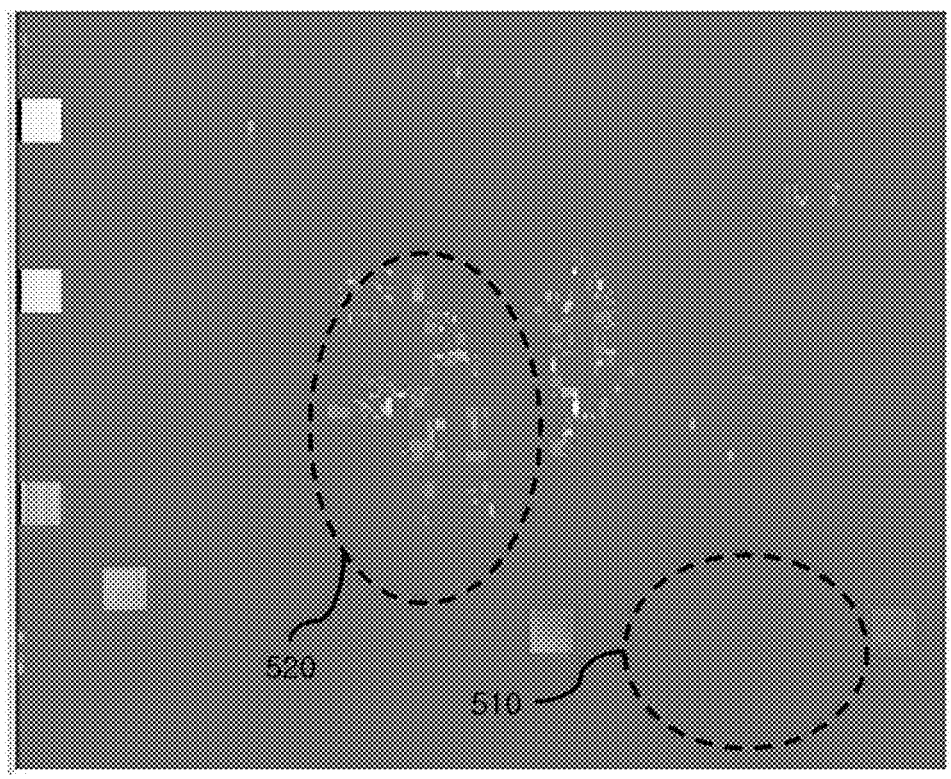

In some embodiments, the prediction information may include residual data, which is determined by subtracting the predicted macroblock (which may be represented by the prediction information) from a macroblock in a current video frame. An image area or macroblock containing a large amount of residual data may represent complex motion objects with great probability. As shown in FIG. 5D, macroblocks containing large values of residual information may represent a moving object such as a human moving (e.g., in image area 520).

In some embodiments, the prediction information may include information on a type of macroblock to be allocated in a video frame ("macroblock type information"). As discussed above, in a variable-size block motion estimation method, smaller size blocks may be allocated in an image area containing complex motion objects in a video frame. For example, as shown in FIG. 5B, image area 520 having moving objects will have a high probability of including smaller sized blocks allocated to the image area. In one embodiment, a macroblock with a block size no greater than a predetermined dimension, e.g., 4×4 may be defined as a "sophisticated" type of macroblock. For example, an image area in a video frame, to which a sophisticated type of macroblock is allocated, may be determined to contain moving objects. In one embodiment, a "skipped macroblock" may be used in determining whether an image area contains moving objects. In general, a skipped macroblock is defined as one whose information on the macroblock is not transmitted and the image area for that macroblock is taken directly from a reference video frame (or from a previously encoded video frame) because of the high correlation between the two blocks in the current video frame and the reference video frame. For example, a skipped macroblock may be defined as a macroblock that does not contain moving objects (e.g., macroblocks denoted by blocks with slanted lines in FIG. 5B). In addition, a sophisticated type of macroblock surrounded by skipped macroblocks may be defined as a macroblock that does not contain moving objects. The macroblock type information may include information on whether a macroblock is to be processed in an intra-coding mode. A macroblock to be processed in an intra-coding mode may be determined to correspond to an image area containing moving objects.

Referring back to FIG. 2, transform/encoding module 134 may produce encoding information based on the prediction information generated by prediction module 132. In particular, transform/encoding module 134 may perform transform and quantization of the prediction information. According to H.264, in the transform process, residual data including the prediction information may be transformed using a 4×4 or 8×8 integer transform, an approximate form of the Discrete Cosine Transform (DCT). The transform process performed by transform/encoding module 134 may output a set of coefficients, each of which is a weighted value for a standard basis pattern. The output of the transform process, a block of transform coefficients, is quantized, i.e., each coefficient is divided by an integer value. Transform/encoding module 134 may perform an encoding process to encode the quantized transform coefficients together with other information (such as information to enable the decoder to re-create the prediction information, information about the structure of the compressed data and the like) to form the compressed bit stream. In the encoding process, variable length coding and/or arithmetic coding may be used to convert the prediction information into binary codes.

Figure 5E:
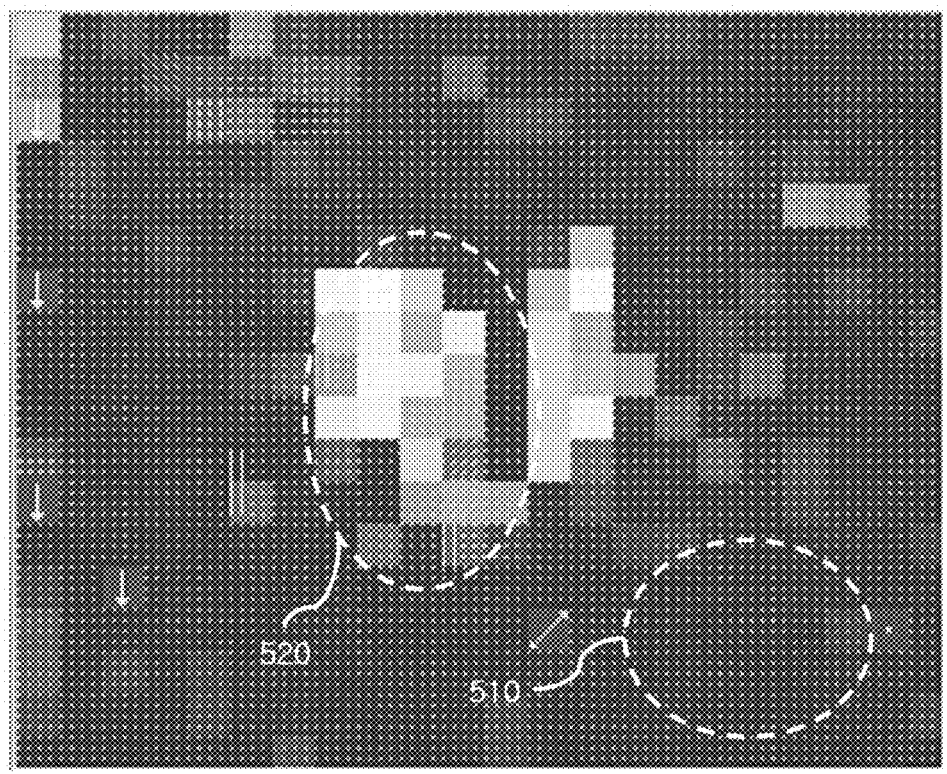

In some embodiments, moving-object tracking unit 140 may perform a moving-object tracking process to detect and keep the track of moving objects in successive video frames. The moving-object tracking process may be performed based on the prediction information generated by prediction module 132 and/or encoding information generated by transform/encoding module 134. The encoding information may include the number of encoded bits per macroblock in an intra-coding mode. For example, FIG. 5E illustrates the number of encoded bits per macroblock for the sample video image (as shown in FIG. 5A), where light-colored regions or macroblocks include more bits encoded per macroblock. Such encoding information may contain information related to residual data. In particular, the large amount of residual data from a macroblock requires more bits to be allocated to encode the macroblock. For example, if the number of bits allocated to encode a macroblock is greater than a predetermined value, the macroblock may be defined to include moving objects. The moving object tracking process may be carried out by moving-object tracking unit 140 simultaneously with any process performed by prediction module 132 and transform/encoding module 134. Moving-object tracking unit 140 may perform the moving-object tracking process based on at least a part of the prediction information and encoding information or a combination of the prediction information and encoding information generated by prediction module 132 and transform/encoding module 134.

In some embodiments, moving-object tracking unit 140 may perform a first motion classification based on at least part of prediction information and encoding information to generate a list of candidate image areas (or macroblocks) containing moving objects. Moving-object tracking unit 140 may then perform a second motion classification based on at least part of the prediction information to determine a list of final image areas containing moving objects. The second motion classification may be performed by eliminating image areas, which do not meet certain classification criteria based on the prediction information, from the list of candidate image areas. Examples of the first and second motion classifications will be described hereinafter.

Figure 6A:
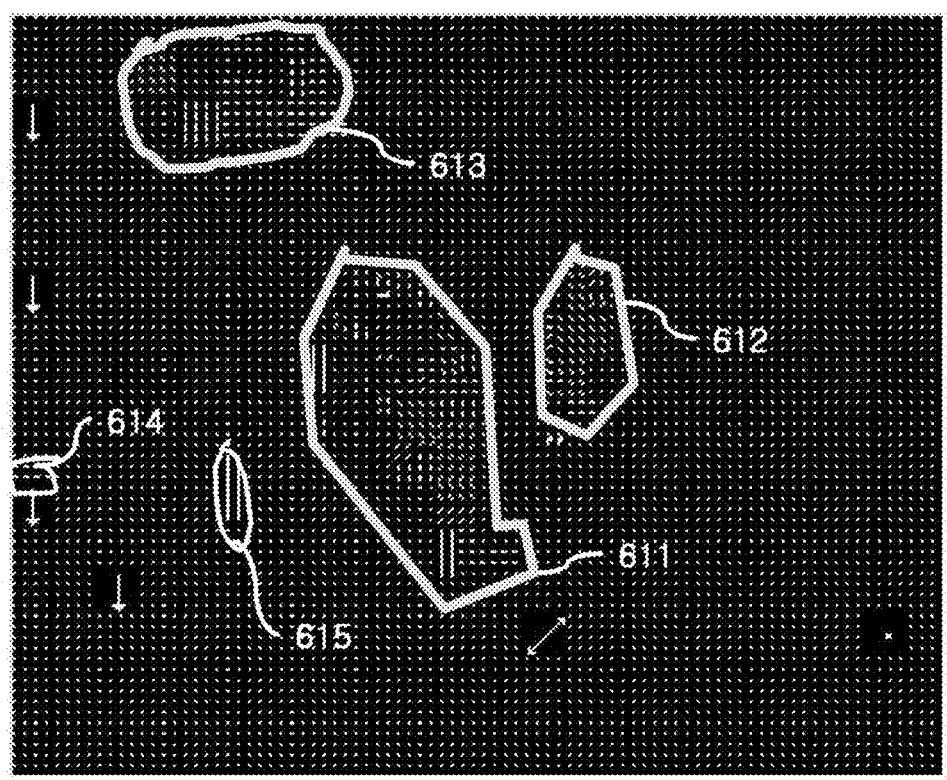

In order to perform the first motion classification, in one embodiment, moving-object tracking unit 140 may determine an image area or a macroblock containing moving objects in a current video frame based on variable-sized motion vectors generated by prediction module 132. The magnitude of a motion vector represents a displacement of a macroblock (e.g., a macroblock with the size of 16×16 or a block with a smaller size such as 16×16, 16×8, 8×16, 8×8, 8×4, 4×8 or 4×4) including objects in a current video frame from a previously-encoded video frame. Accordingly, if the motion vector has a greater magnitude, the macroblock has moving objects with higher probability. FIG. 6A illustrates motion vectors for the sample video image as shown in FIG. 5A, indicating image areas 610 to 650 with greater magnitudes of motion vectors. For example, if the magnitude of a motion vector for a macroblock (e.g., image areas 611 to 615 in FIG. 6A) in a current video frame is greater than a predetermined value, the macroblock may be determined as a candidate image area including moving objects.

Figure 6B:
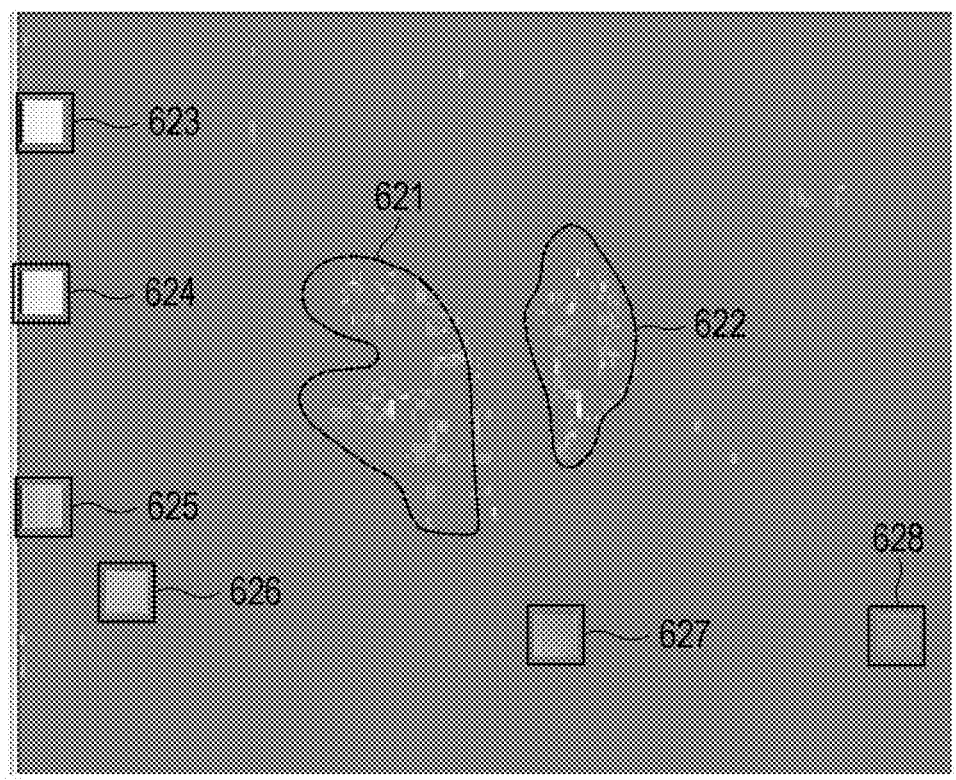

In another embodiment, moving-object tracking unit 140 may determine a candidate image area or macroblock based on residual information generated by prediction module 132. A macroblock containing a large amount of residual data may represent complex motion objects with great probability. FIG. 6B illustrates residual information for the sample video image as shown in FIG. 5A, indicating image areas 621 to 628 with greater magnitudes of residual information. For example, if the magnitude of the residual information for a macroblock (e.g., image areas 621 to 628 in FIG. 6B) in a current video frame is greater than a predetermined value, the macroblock may be determined as a candidate image area including moving objects. In still another embodiment, moving-object tracking unit 140 may determine a candidate image area or macroblock based on macroblock type information generated by prediction module 132. If an intra-coding mode is assigned to a macroblock, that macroblock may be part of a moving object. For example, if the macroblock type information indicates that a macroblock in a current video frame is to be processed in an intra-coding mode, moving-object tracking unit 140 may determine the macroblock as a candidate image area including moving objects.

Figure 6C:
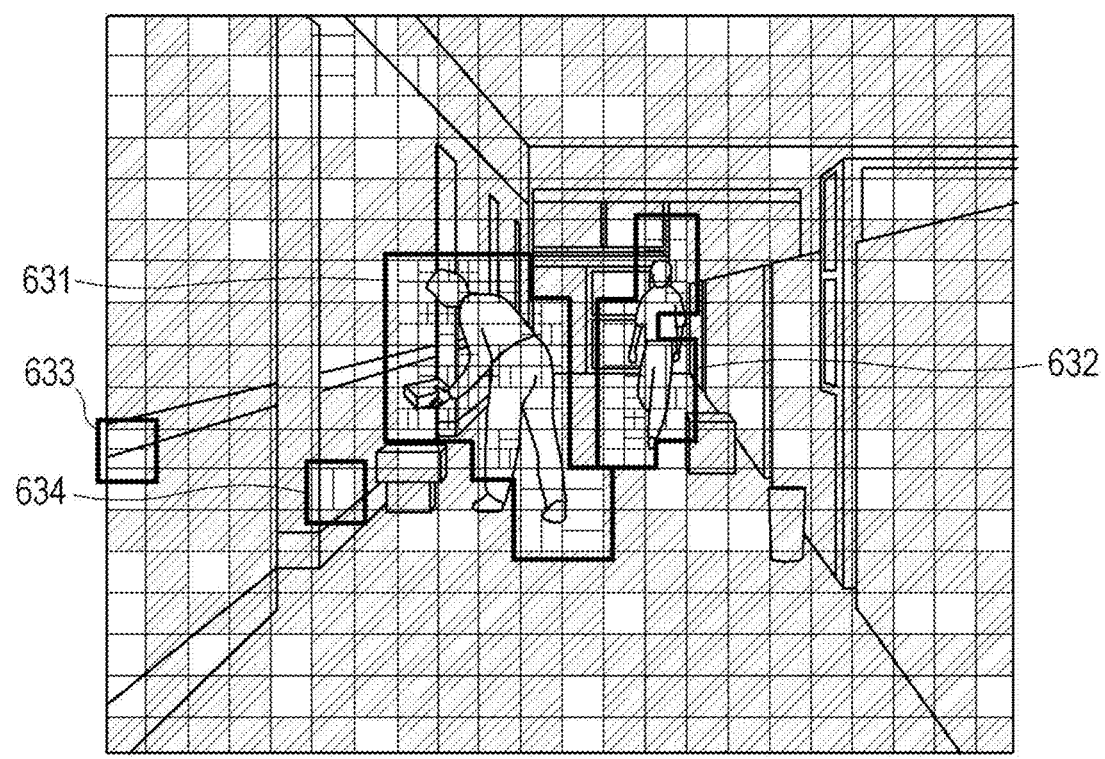

As another example, if the macroblock type information indicates that a macroblock in a current video frame is determined to be a sophisticated type (e.g., macroblock with a block size no greater than 4×4), the macroblock may be determined as a candidate image area including moving objects. As discussed above, an image area (or macroblock) having moving objects will have a high probability of including smaller sized blocks allocated to the image area. FIG. 6C illustrates partitioning of the sample video image (as shown in FIG. 5A) with various sizes of macroblocks. As shown, if the partitioning of the image is quite complex in some areas of the video image (such as image areas 631 to 634 in FIG. 6C), those image areas may be a part of the region including moving objects.

In some embodiments, moving-object tracking unit 140 may perform the first motion classification based on encoding information generated by transform/encoding module 134. For example, image areas including macroblocks with a greater magnitude of the residual information (e.g., image areas 621 to 628 in FIG. 6B) may have a greater number of bits allocated to the macroblocks. Image areas including macroblocks with a greater number of bits allocated may be a part of the region including moving objects. For example, if the encoding information indicates that the number of bits allocated to encode a macroblock is greater than a predetermined number, the macroblock may be determined as a candidate image area including moving objects. While the number of bits allocated to encode a macroblock may depend on the complexity of an image represented by the macroblock, the predetermined number used in determining the candidate image area may be set based on an average number of bits allocated to encode a macroblock. Such average number of bits may be calculated by transform/encoding module 134 based on previously input image data. In particular, an average number of bits may be calculated by summing the number of bits allocated to encode all macroblocks included in a video frame and then dividing the sum of the numbers of bits by the number of the macroblocks. In one embodiment, transform/encoding module 134 may maintain the latest updated average number of bits to perform the first motion classification.

In the second motion classification, moving-object tracking unit 140 may apply additional classification criteria to the moving-object tracking process based on prediction information, thereby determining a list of final image areas containing moving objects. The second motion classification may be performed by eliminating image areas, which do not meet the classification criteria, out of the list of candidate image areas. Examples of the additional classification criteria for the second motion classifications will be described hereinafter. In one embodiment, the size of macroblocks may be used as the classification criteria for the second motion classification. For example, if a variable-size block motion estimation method is used in the moving-object tracking process (as described above with respect to FIGS. 6A and 6B), a macroblock with a size no greater than a predetermined value (e.g., 4×4) may be eliminated from the list of candidate image areas. For example, image areas 614 and 615 which are smaller in size may be eliminated from candidate image areas 611 to 615 in FIG. 6A, while image areas 623 to 628 which are smaller in size may be eliminated from candidate image areas 621 to 628 in FIG. 6B). In another embodiment, the type of macroblocks surrounding a macroblock may be used as the classification criteria. For example, if the macroblock type information is used in the moving-object tracking process (as described above with respect to FIG. 6C) and if a macroblock included in the list of candidate image areas is a sophisticated type of macroblock surrounded by skipped macroblocks, that macroblock may be eliminated out of the list of candidate image areas. For example, image areas 633 and 634 with sophisticated type of macroblocks surrounded by skipped macroblocks (indicated in blocks with slanted lines) may be eliminated from candidate image areas 631 to 634 in FIG. 6C.

In some embodiments, moving-object tracking unit 140 may perform an additional moving-object tracking process based on a weighted combination of at least part of the above-described individual motion classification results. Such additional moving-object tracking process may be performed as an optional step after the first and second motion classifications are completed. In some embodiments, a weighted "AND" operation may be used to determine the weighted combination of the first and second motion classification results for determination of an image area or a macroblock containing moving objects. For example, as shown in FIG. 6D, moving-object tracking unit 140 may perform a moving-object tracking process based on a "AND" combination of the individual motion classification results which is described above with respect to FIGS. 6A to 6C. For example, a predetermined weight ranging from 0.0 to 1.0 may be given for respective lists of candidate image areas (or macroblocks) determined based on corresponding motion classification criteria. In one embodiment, a greater weight (e.g., 0.7) may be given for a list of candidate image areas determined based on prediction information, while a lesser weight (e.g., 0.3) may be given for a list of candidate image areas determined based on encoding information. A list of final image areas may be determined by combining the respective lists of candidate image areas with the predetermined weights and selecting image areas with weights greater than a predetermined value (e.g., 0.5). Further, moving-object tracking unit 140 may perform at least one of the first motion classification and the second motion classification to determine a list of final image areas containing moving objects. Once the list of final image areas containing moving objects is determined, moving-object tracking unit 140 may generate location information of tracked moving objects based on the list of final image areas containing moving objects. In one embodiment, the location information of tracked moving objects may include two dimensional coordinates of the moving objects within the current video frame.

As shown in FIG. 1, camera control unit 150 may generate a control signal based on the location information from moving-object tracking unit 140 and transmit the control signal to second camera 114 (such as a PZT camera). Camera control unit 150 may transmit the control signal to second camera 114 to control the movement of second camera 114, e.g., using a communication module. The control signal may operate or control second camera 114 to pan and/or zoom in/out so that second camera 114 may capture a feature part (e.g., a face) of the object (e.g., a person) that is being tracked by moving-object tracking unit 140. Camera control unit 150 may define the positional relationship between first camera 112 and second camera 114. In some embodiments, first camera 112 and second camera 114 may view portions of the same region so that one point in the first video frames may be mapped to another point in the second image frames. The first image frames and the second image frames may have been captured or acquired by first camera 112 and second camera 114, respectively. Camera control unit 150 may use the location information of the moving objects being tracked in the first image frames, and the positional relationship between first camera 112 and second camera 114 to thereby generate the control signal to control the movement of second camera 114. For example, camera control unit 150 may process the location information of the objects being tracked in the first image frames with the positional relationship between first camera 112 and second camera 114 to thereby estimate the location over which second camera 114 is to cover and emphasize by panning and/or zooming in/out. In this way, camera control unit 150 may allow second camera 114 to capture the feature part of the object being tracked. In some embodiments, second camera 114 may be coupled to another video processing unit (not shown) for further processing such as encoding the feature part of the object being tracked into a video image (e.g., in MPEG or H.264 format) or still image (e.g., in JPEG format).

Surveillance system 100 may include a display (not shown) to provide a visual output such as a video (e.g., video captured by first camera 112 and/or video captured by second camera 114) and/or the results of the processing of the digital image data, etc., for viewing, for example, by an operator. The display may include, but is not limited to, flat panel displays, including CRT displays, as well as other suitable output devices. Surveillance system 100 may also include other peripheral output devices (not shown), such as a speaker or a printer.

In some embodiments, surveillance system 100 may further include a communication module that provides logical connectivity to at least one external device via a wired or wireless communication protocol. A communication protocol (either wired or wireless) may be implemented by employing a digital interface protocol, such as a serial port, parallel port, PS/2 port, universal serial bus (USB) link, firewire or IEEE 1394 link, or wireless interface connection, such as an infrared interface, BlueTooth®, ZigBee, high-definition multimedia interface (HDMI), high-bandwidth digital content protection (HDCP), wireless fidelity (Wi-Fi), local area network (LAN), wide area network (WAN) or the like. In some embodiments, the communication module may include a modem to communicate through mobile communications systems such as a Global System for Mobile Communications (GSM), Global Positioning System (GPS), Digital Mobile Multimedia (DMB), Code Division Multiple Access (CDMA), High-Speed Down Link Packet Access (HSDPA), Wi-Bro Wireless Broadband, or the like. It will be appreciated that the connection methods described in the present disclosure are only examples and other methods of establishing a communications link between the devices/computers may be used.

In a networked environment, part or all of the components of surveillance system 100 may be implemented as a distributed system through two or more devices, depending on the desired implementations. For example, video processing unit 130 and moving-object tracking unit 140 may be implemented on a server, and other modules/components of surveillance system 100 may be implemented at a mobile device or terminal. In this example, the mobile terminal may transmit the digital image data of the video frames (e.g., captured by first camera 112 installed in the mobile terminal) to the server via the communication module, so that the server may perform video encoding and moving-object tracking processes and transmit a control signal so that the mobile terminal operates the camera installed therein (e.g., second camera 114) for further processing. Surveillance system 100 may operate in a networked environment using logical connections to one or more remote devices, such as a remote computer. The remote computer may be a personal computer, a server, hand-held or laptop devices, a router, a network PC, a peer device, or other common network nodes, and typically may include some or all of the components described in the present disclosure relative to surveillance system 100.

Surveillance system 100 of FIG. 1 is only one example of a suitable operating environment and is not intended to be limiting. Other well known computing systems, environments, and/or configurations that may be suitable for the image processing described in the present disclosure include, but are not limited to, personal computers, portable devices such as cellular phones, server computers, hand-held or laptop devices, multiprocessor systems, micro-processor based systems, programmable consumer electronics, network personal computers, mini-computers, mainframe computers, distributed computing environments that include any of the units or devices illustrated in FIG. 1, or the like.

Figure 7:
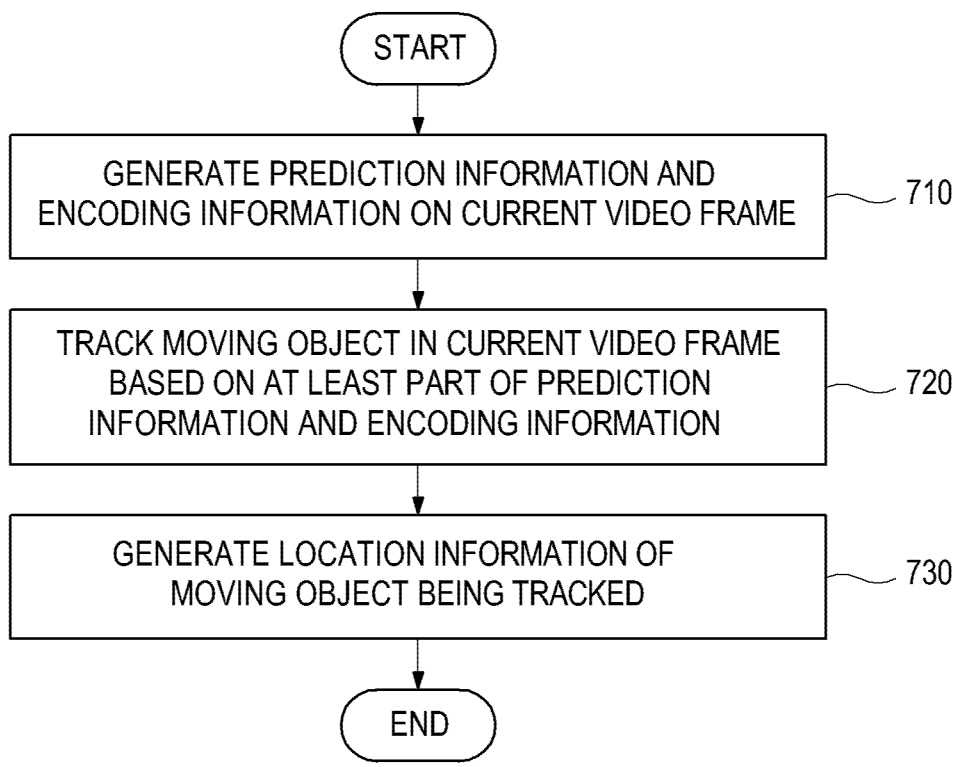
FIG. 7 is a flow chart of an illustrative embodiment of a surveillance method.

FIG. 7 is a flow chart of an illustrative embodiment of a surveillance method. In block 710, video processing unit 130 generates prediction information on a current video frame. The first video frame may be captured or acquired by first camera 112 (e.g., a wide-angle camera). Video processing unit 130 may transform the current video frame into digital image data using any of a variety of well-known data processing techniques such analog to digital conversion, quantization or the like. As part of the processing of the digital image data, video processing unit 130 may carry out prediction, transform and encoding processes to produce a bit stream to be transmitted to a remote unit over a data network. In one embodiment, video processing unit 130 may process a video frame in units of a macroblock (e.g., with size of 4×4, 4×8, 8×4, 8×8, 8×16, 16×8, 16×16 displayed pixels) to generate prediction information and encoding information of the video frame. As described in detail above, the prediction information may include at least one of motion vectors, residual data and macroblock type information. The encoding information may include the number of encoded bits per macroblock in an intra-coding mode. Video processing unit 130 may generate prediction information and encoding information by using motion estimation methods, e.g., variable-size block motion estimation supported by well-known compression standards such as motion-picture-experts group (MPEG) or H.264.

Figure 8:
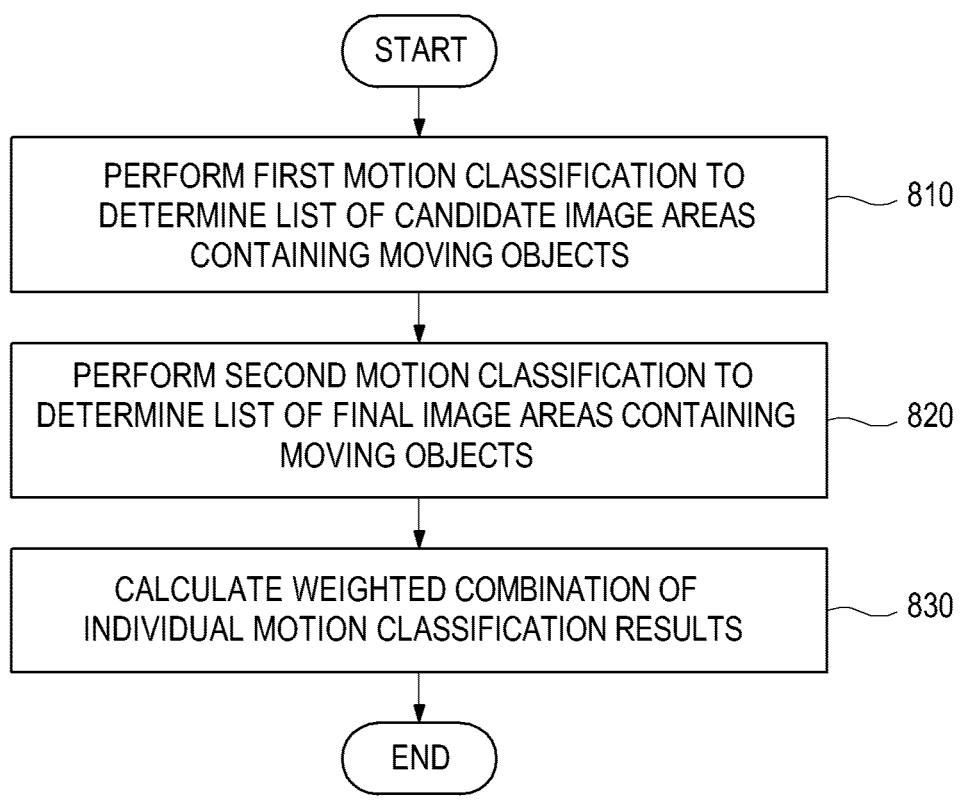
FIG. 8 is a flow chart of an illustrative embodiment of a moving-object tracking process.

In block 720, moving-object tracking unit 140 tracks moving objects in the current video frame based on at least a part of prediction information and encoding information or a combination of prediction information and encoding information. FIG. 8 is a flow chart of an illustrative embodiment of a moving-object tracking process performed by moving-object tracking unit 140, which includes two steps 810 and 820 of motion classification based on the prediction information and the encoding information. Moving-object tracking unit 140 may perform additional step 830 of calculating a weighted combination of individual motion classification results from steps 810 and 820.

Figure 9:
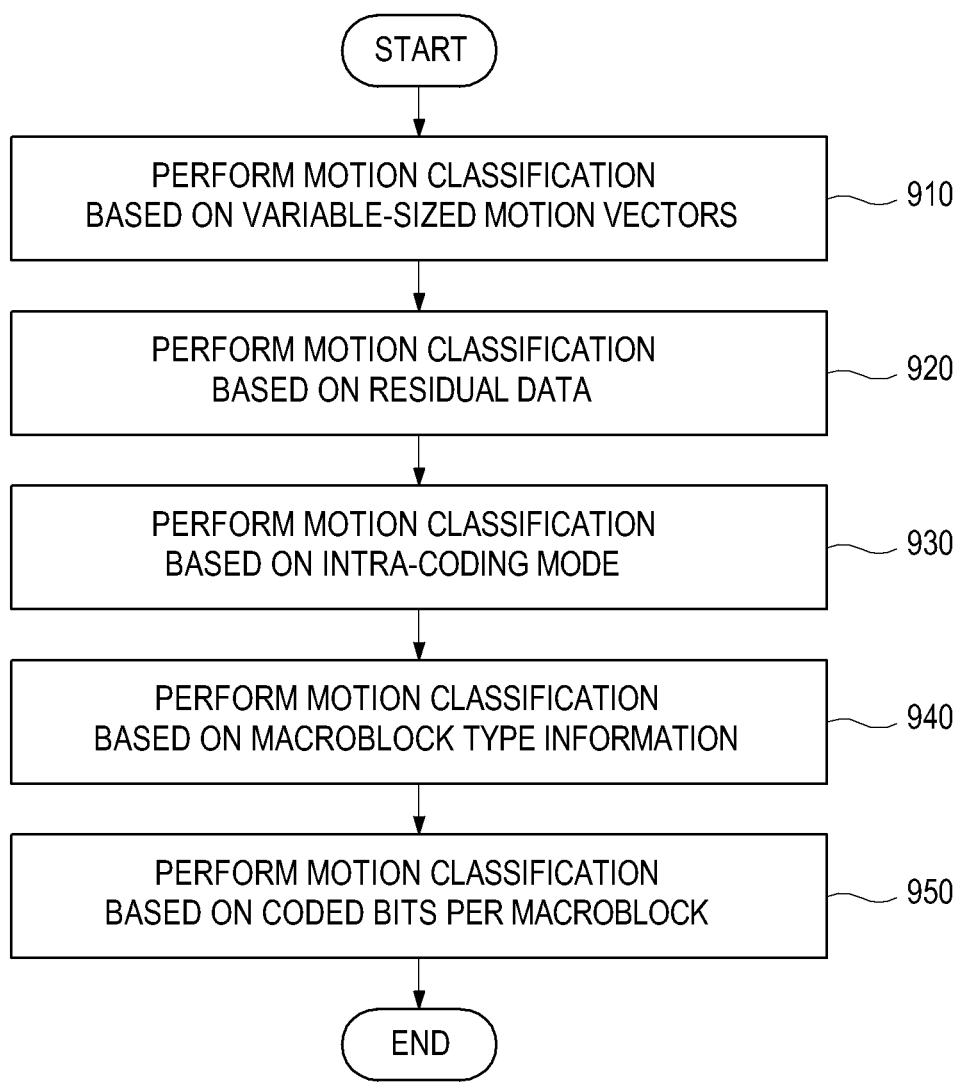
FIG. 9 is a flow chart of an illustrative embodiment of a motion classification process.

In block 810, moving-object tracking unit 140 performs a first motion classification to determine a list of candidate image areas or macroblocks containing moving objects. In the first motion classification, the list of candidate image areas may be determined based on at least one of motion vectors, residual data and macroblock type information generated in block 710. As described in detail above and illustrated in block 910 of FIG. 9, the first motion classification may be performed based on variable-sized motion vectors. For example, if a magnitude of a variable-sized motion vector for a macroblock in a current video frame is greater than a predetermined value, the macroblock may be determined as a candidate image area including moving objects. In block 920, the first motion classification may be performed based on residual data. For example, if a magnitude of residual data for a macroblock in a current video frame is greater than a predetermined value, the macroblock may be determined as a candidate image area including moving objects. Further, in block 930, the first motion classification may be performed based on information on intra-coding mode. For example, if the macroblock type information indicates that a macroblock in a current video frame is to be processed in an intra-coding mode, the macroblock may be determined as a candidate image area including moving objects. In block 940, the first motion classification may be performed based on macroblock type information. For example, if the macroblock type information indicates that a macroblock in a current video frame is a sophisticated type (e.g., macroblock with a block size no greater than 4×4), the macroblock may be determined as a candidate image area including moving objects. Additionally, in block 950, the first motion classification may be performed based on coded bits per macroblock. For example, if the encoding information indicates that the number of bits allocated to encode a macroblock is greater than a predetermined number, the macroblock may be determined as a candidate image area including moving objects. As described above in detail, the predetermined number used in determining the candidate image area may be set based on an average number of bits allocated to encode a macroblock, which may be calculated by transform/encoding module 134 based on previously input image data.

In block 820, moving-object tracking unit 140 performs a second motion classification to determine a list of final image areas or macroblocks containing moving objects. In the second motion classification, macroblocks or image areas may be eliminated out of the list of candidate image areas determined in block 810 if those macroblocks do not satisfy predetermined criteria as described below in detail. As described in detail above, if a variable-size block motion estimation method is used in a moving-object tracking process, a macroblock with a size no greater than a predetermined value (e.g., 4×4) may be eliminated out of the list of candidate image areas. Further, if a sophisticated type of macroblock is surrounded by skipped macroblocks, that macroblock may be eliminated out of the list of candidate image areas.

In block 830, moving-object tracking unit 140 may perform an additional moving-object tracking process based on a weighted combination of at least part of the individual motion classification results determined in blocks 810 and 820. In some embodiments, a weighted "AND" operation may be used to determine the weighted combination of the first and second motion classification results for determination of an image area or a macroblock containing moving objects. As described above in detail, a predetermined weight ranging from 0.0 to 1.0 may be given for respective lists of candidate image areas (or macroblocks) determined based on corresponding motion classification criteria. A list of final image areas may be determined by combining the respective lists of candidate image areas with the predetermined weights and selecting image areas with weights greater than a predetermined value (e.g., 0.5).

Referring back to FIG. 7, in block 730, once the list of final image areas containing moving objects is determined in block 720, moving-object tracking unit 140 may generate location information of tracked moving objects based on the list of final image areas containing moving objects. Moving-object tracking unit 140 may transmit the location information to camera control unit 150, which generates a control signal based on the location information of the moving objects being tracked to control the operation of second camera 114 (e.g., a narrow-angle camera). For example, camera control unit 150 may transmit the control signal to manipulate second camera 114 to pan and/or zoom in/out second camera 114. Using the control signal, camera control unit 150 operates second camera 114 to capture a particular part (e.g., a face) of the object (e.g., a person) being tracked. Camera control unit 150 may use the positional relationship between first camera 112 and second camera 114 and the location information of the object being tracked in the current video frame to generate the control signal to control the movement of second camera 114. In some embodiments, second camera 114 may transmit information on a certain part of the object being tracked to another video processing unit for further processing such as encoding the part of the object being tracked into a video image (e.g., in MPEG or H.264 format) or still image (e.g., in JPEG format).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In light of the present disclosure, those skilled in the art will appreciate that the systems, apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a computer-readable or processor-readable medium or a computer program product, or transmitted as a computer data signal embodied in a carrier wave, or a signal modulated by a carrier, over a transmission medium or communication link. The machine-readable medium may include any medium capable of storing or transferring information in a form readable and executable by a machine (e.g., by a processor, a computer, etc.).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," or the like include the number recited and refer to ranges which can be subsequently broken down into subranges as discussed above.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A surveillance system comprising:
   an input unit configured to receive a plurality of video frames that are acquired through a first camera;
   a video processor configured to generate prediction information and encoding information on the plurality of video frames that have been encoded;
   a moving-object tracking processor configured to:
      track a moving object in the plurality of video frames based on at least part of the prediction information and the encoding information;
      perform a first motion classification to identify a list of candidate image areas in the plurality of video frames for the moving object based on the prediction information and the encoding information;
      weight each candidate image area identified in the list of candidate image areas, wherein a greater weight is given to candidate image areas determined from the prediction information and a lesser weight is given to candidate image areas determined from the encoding information;
      perform a second motion classification on each of the candidate image areas in the list of candidate image areas based on the weights of the candidate image areas and on additional prediction information or additional encoding information to eliminate some of the candidate image areas in order to identify final image areas from the list of candidate image areas; and
      generate location information of the moving object based on the final image areas; and
   a camera control processor configured to generate a control signal based on the location information and to transmit the control signal to a second camera to control movement of the second camera effective to capture a feature part of the moving object.

2. The system of claim 1, wherein the prediction information includes at least one of motion vectors, residual data and macroblock type information on the plurality of video frames; and
   wherein the video processor executes a transform/encoding instruction configured to generate the encoding information which indicates a number of bits allocated to encode a macroblock in the plurality of video frames.

3. The system of claim 2, wherein the moving-object tracking processor performs the first motion classification to determine a list of candidate macroblocks including moving objects based on at least part of the prediction information and the encoding information, wherein the list of candidate image areas includes the list of candidate macroblocks.

4. The system of claim 3, wherein the moving-object tracking processor performs the first motion classification based on a motion vector of a macroblock, wherein if a magnitude of the motion vector is greater than a particular value, the macroblock is determined to be included in the list of candidate macroblocks.

5. The system of claim 3, wherein the moving-object tracking processor performs the first motion classification based on residual data of a macroblock, wherein if a magnitude of the residual data is greater than a particular value, the macroblock is determined to be included in the list of candidate macroblocks.

6. The system of claim 1, wherein the moving-object tracking processor performs the first motion classification to determine a list of candidate macroblocks based on macroblock type information, wherein if the macroblock type information indicates that a macroblock is to be processed in an intra-coding mode, the macroblock is determined to be included in the list of candidate macroblocks, wherein the macroblock type information is included in the prediction information and wherein the list of candidate image areas includes the list of candidate macroblocks.

7. The system of claim 1, wherein the moving-object tracking processor performs the first motion classification to determine a list of candidate macroblocks based on macroblock type information, wherein if the macroblock type information indicates that a macroblock includes M×M image pixels, M being no greater than a particular number, the macroblock is determined to be included in the list of candidate macroblocks, wherein the macroblock type information is included in the prediction information and wherein the list of candidate image areas includes the list of candidate macroblocks.

8. The system of claim 3, wherein the moving-object tracking processor performs the first motion classification based on the encoding information, wherein if the encoding information indicates that a number of coded bits for a macroblock is greater than a particular number, the macroblock is determined to be included in the list of candidate macroblocks.

9. The system of claim 3, wherein the moving-object tracking processor performs the second motion classification to eliminate a macroblock out of the list of candidate macroblocks, wherein if the additional prediction information indicates that the macroblock includes M×M image pixels, M being no greater than a particular number, the macroblock is determined to be eliminated out of the list of candidate macroblocks.

10. The system of claim 3, wherein the moving-object tracking processor performs the second motion classification to eliminate a macroblock out of the list of candidate macroblocks based on at least part of the additional prediction information, wherein if the prediction information indicates that the macroblock is surrounded by skipped macroblocks, the macroblock is determined to be eliminated out of the list of candidate macroblocks.

11. The system of claim 1, wherein the second camera includes a pan-tilt-zoom (PTZ) camera, wherein the PTZ camera is panned or tilted to take a video based on the control signal.

12. A surveillance method comprising:
   generating prediction information and encoding information on a plurality of video frames that are acquired from a first camera;
   tracking a moving object in the plurality of video frames based on at least part of the prediction information and the encoding information, the prediction information including motion vectors, residual data and macroblock type information on the plurality of video frames;
   determining candidate image areas in the plurality of video frames for the moving object using the prediction information and the encoding information,
   weighting each of the candidate image areas, wherein a greater weight is given to candidate image areas determined from the prediction information and a lesser weight is given to candidate image areas determined from the encoding information;
   selecting final image areas based on the weights of the candidate image areas and by applying classification criteria that is based at least on the prediction information to all of the candidate image areas in order to eliminate some of the candidate image areas;

generating location information for the moving object based on the final image areas;

generating a control signal based on the location information of the moving object; and transmitting the control signal to a second camera to control movement of the second camera effective to capture a feature part of the moving object.

13. The method of claim 12, wherein tracking the moving object includes:

performing a first motion classification to determine a list of candidate macroblocks containing moving objects; and performing a second motion classification to determine a list of final macroblocks containing moving objects, wherein the candidate image areas includes the list of candidate macroblocks.

14. The method of claim 13, wherein in the first motion classification, if a magnitude of a motion vector of a macroblock is greater than a particular value, the macroblock is determined to be included in the list of candidate macroblocks.

15. The method of claim 13, wherein in the first motion classification, if a magnitude of residual data of a macroblock is greater than a particular value, the macroblock is determined to be included in the list of candidate macroblocks.

16. The method of claim 13, wherein in the first motion classification, if a macroblock type information indicates that a macroblock is to be processed in an intra-coding mode, the macroblock is determined to be included in the list of candidate macroblocks.

17. The method of claim 13, wherein in the first motion classification, if a macroblock type information indicates that a macroblock includes M×M image pixels, M being no greater than a particular number, the macroblock is determined to be included in the list of candidate macroblocks.

18. The method of claim 13, wherein in the first motion classification, if the encoding information indicates that a number of coded bits for a macroblock is greater than a particular number, the macroblock is determined to be included in the list of candidate macroblocks.

19. The method of claim 13, wherein in the second motion classification, if the prediction information indicates that a macroblock includes M×M image pixels, M being no greater than a particular number, the macroblock is determined to be eliminated out of the list of candidate macroblocks.

20. The method of claim 13, wherein in the second motion classification, if the prediction information indicates that a macroblock is surrounded by skipped macroblocks, the macroblock is determined to be eliminated out of the list of candidate macroblocks.

21. A surveillance system comprising:

an input unit configured to receive a plurality of video frames that are acquired through a first camera;

a video processor configured to generate prediction information and encoding information on the plurality of video frames;

a moving-object tracking processor configured to:

track a moving object in the plurality of video frames based on at least part of the prediction information and the encoding information to generate location information of the moving object, perform a first motion classification to determine a list of candidate macroblocks in the plurality of video frames that include moving objects based on the at least part of the prediction information and the encoding information, weight each candidate macroblock in the list of candidate macroblocks, wherein a greater weight is given to candidate macroblocks determined from the prediction information and a lesser weight is given to candidate macroblocks determined from the encoding information, perform a second motion classification based on the weights of the candidate macroblocks and the prediction information on each of the candidate macroblocks to eliminate some of the candidate macroblocks from the list of candidate macroblocks and determine final macroblocks from the list of candidate macroblocks;

determine the location information based on the final macroblocks;

a camera control processor configured to generate a control signal based on the location information and to transmit the control signal to a second camera to control movement of the second camera.

22. The surveillance system of claim 21, wherein the moving-object tracking processor performs the first motion classification based on one or more of a motion vector of a macroblock, residual data of the macroblock, or type information of the macroblock, wherein the macroblock is included in the list of candidate macroblocks if at least one of a magnitude of the motion vector is greater than a particular value, a magnitude of the residual data is greater than a particular value, or the type information of the macroblock indicates that the macroblock is to be processed in an intra-coding mode.

23. The system of claim 22, wherein the moving-object tracking processor performs the first motion classification based on at least one of the encoding information or the type information of the macroblock, wherein the macroblock is included in the list of candidate macroblocks if the encoding information indicates that a number of coded bits for the macroblock is greater than a particular number or the type information of the macroblock indicates that a macroblock includes M×M image pixels, M being no greater than a particular number.

24. The system of claim 22, wherein the moving-object tracking processor performs the second motion classification to eliminate a macroblock out of the list of candidate macroblocks based on at least part of the prediction information, wherein if the prediction information indicates that the macroblock includes M×M image pixels, M being no greater than a particular number, or if the prediction information indicates that the macroblock is surrounded by skipped macroblocks, the macroblock is determined to be eliminated out of the list of candidate macroblocks.

25. The surveillance system of claim 21, wherein the control signal is effective to control the movement of the second camera to capture a feature part of the moving object.

26. A surveillance system comprising:

an input unit configured to receive a plurality of video frames that are acquired through a first camera;

a video processor configured to generate prediction information and encoding information associated with the plurality of video frames that have been encoded;

a moving-object tracking processor configured to:

perform a first motion classification to determine a list of candidate macroblocks in the plurality of video frames that include moving objects based on the prediction information and the encoding information associated with the encoded plurality of video streams, wherein a macroblock is included in the list of candidate macroblocks in response to at least one of:
- a number of bits used to encode the macroblock is greater than a particular number;
- a magnitude of a motion vector for the macroblock is greater than a particular value;
- residual information of the macroblock is greater than a specific value; an intra-coding mode is assigned to the macroblock; and/or
- the macroblock is a sophisticated macroblock;

weight each candidate macroblock in the list of candidate macroblocks, wherein a greater weight is given to candidate macroblocks determined from the prediction information and a lesser weight is given to candidate macroblocks determined from the encoding information;

perform a second motion classification based on the weights of the candidate macroblocks and on the prediction information on each of the candidate macroblocks to eliminate some of the candidate macroblocks from the list of candidate macroblocks and to determine final macroblocks from the list of candidate macroblocks, wherein at least:
- a macroblock with a size no greater than a particular value, if a variable-size block motion estimate method is used, is eliminated from the list of candidate macroblocks; and
- a sophisticated macroblock surrounded by skipped macroblocks is eliminated from the list of candidate macroblocks; determine location information based on the final macroblocks; and track an object based on the location information; and a camera control processor configured to generate a control signal based on the location information and to transmit the control signal to a second camera to control movement of the second camera.

* * * * *